H. T. JOHNSON & C. E. AVERY.
TESTING GALVANOMETER.
APPLICATION FILED MAR. 22, 1906.

903,195.

Patented Nov. 10, 1908.

2 SHEETS—SHEET 1.

WITNESSES:
Alexander Smith
M. L. McLaughlin

INVENTORS
Harry J. Johnson
Charles E. Avery
BY
ATTORNEY

H. T. JOHNSON & C. E. AVERY.
TESTING GALVANOMETER.
APPLICATION FILED MAR. 22, 1906.

903,195.

Patented Nov. 10, 1908.

2 SHEETS—SHEET 2.

WITNESSES:
Alexander Smith
M. J. McLaughlin

INVENTORS
Harry T. Johnson
Charles E. Avery
BY
J. G. Metcalf
ATTORNEY

UNITED STATES PATENT OFFICE.

HARRY T. JOHNSON, OF NEW YORK, N. Y., AND CHARLES E. AVERY, OF JERSEY CITY, NEW JERSEY.

TESTING-GALVANOMETER.

No. 903,195.　　　Specification of Letters Patent.　　　Patented Nov. 10, 1908.

Application filed March 22, 1906. Serial No. 307,426.

*To all whom it may concern:*

Be it known that we, HARRY T. JOHNSON, a citizen of the United States, and a resident of the borough of Manhattan, city, county, and State of New York, and CHARLES E. AVERY, a citizen of the United States, and a resident of the city of Jersey City, Hudson county, New Jersey, have invented certain new and useful Improvements in Testing-Galvanometers, of which the following is a full, clear, and exact description, reference being had to the accompanying drawings, forming part of this specification.

Our invention relates to electrical measuring instruments and the object thereof is to provide a simple compact and durable instrument by which the approximate resistance of an electric circuit may be readily measured or determined.

A preferred form of our invention is illustrated in the accompanying drawings and will be specifically described, without however limiting the invention to the precise form or arrangement of parts illustrated or described.

Figure 1:
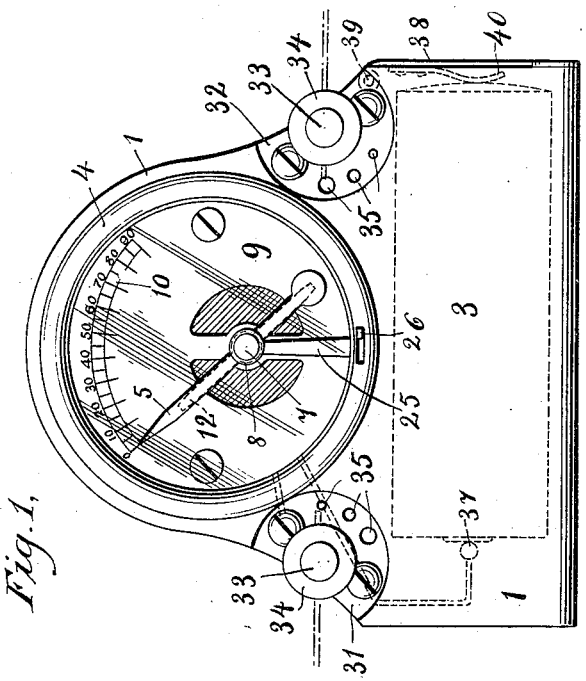
Figure 2:
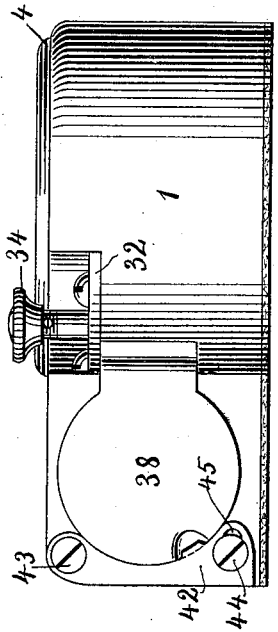
Figure 3:
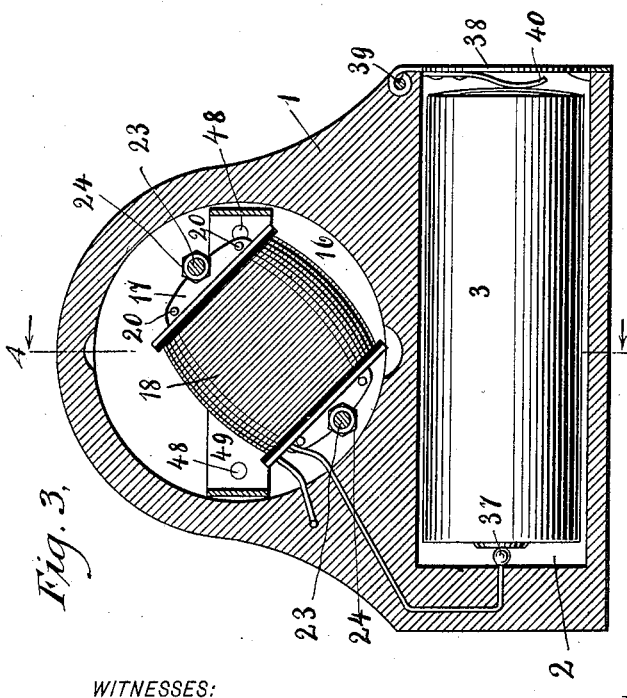
Figure 4:
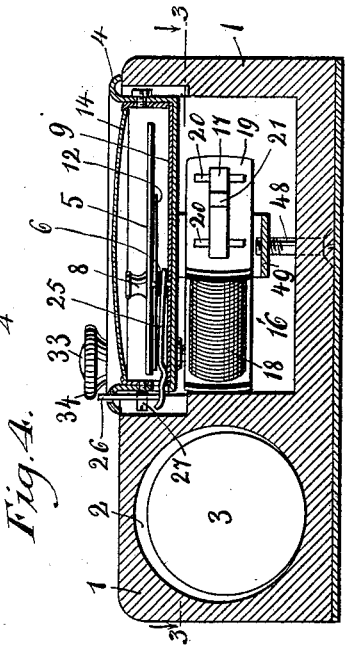
Figure 5:
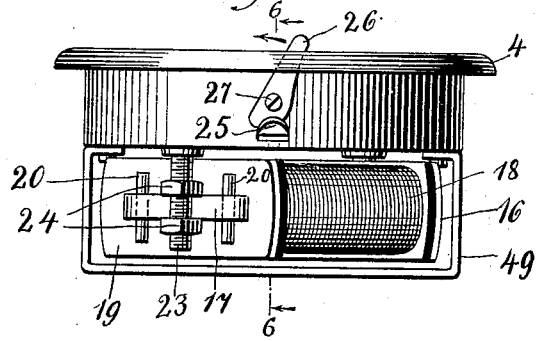
Figure 6:
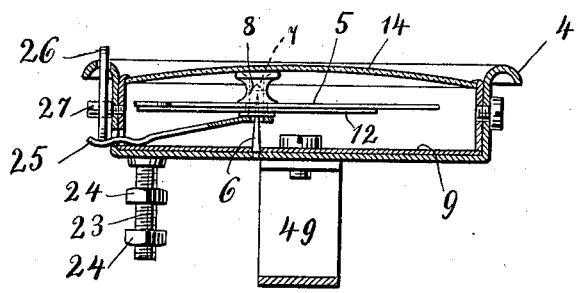
Figure 7:
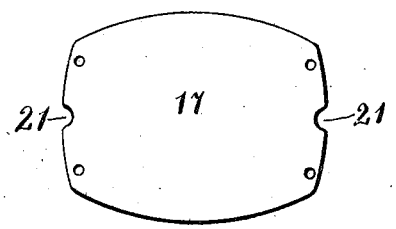
Figure 8:
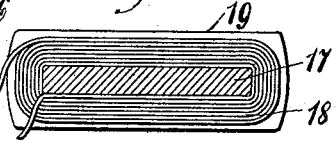

In the drawings Figure 1 is a plan view of an instrument embodying our invention; Fig. 2 is an end elevation thereof; Fig. 3 is a sectional plan on the line 3—3 (Fig. 4); Fig. 4 is a sectional elevation on the line 4—4 (Fig. 3); Fig. 5 is an elevation partly in section of the cup in which the indicating needle is mounted; Fig. 6 is a vertical section thereof on the line 6—6 (Fig. 5); Fig. 7 is a plan view of the magnet core and Fig. 8 is a transverse section of the magnet.

Similar reference characters are employed to designate corresponding parts in all the views.

In the drawings, which for the sake of greater clearness are made on an enlarged scale, the apparatus is shown compactly arranged in an inclosing case 1, made of wood or other suitable non-conducting material and which may be conveniently carried in a pocket of the user.

The case 1 is provided with a chamber 2 in which a dry battery cell 3 is completely inclosed so that in case of any leakage in the battery the operating parts of the instrument will not be affected thereby. The case 1 is also recessed to receive and support a cup 4 within which an indicator 5 is mounted upon a pin 6. The indicator 5 is balanced upon the pin 6 by means of an agate bearing 7 mounted in the cup 8 in a manner well understood. In order to give the indicator 5 a relatively wide range of movement one end thereof is prolonged and terminates in a point under which, upon a dial 9, is arranged a scale 10 which is traversed by the indicator point. A permanently magnetized strip of metal 12 is rigidly secured to the under side of the indicator 5, the two thus forming a magnetic needle tending to point north. The top of the cup 4 is closed by a glass cover 14 through which the movement of the indicator 5 may be observed.

For the purpose of operating the magnetic needle we employ in combination therewith an electro-magnet 16, comprising a core 17 and coils or helices 18. In the form preferred by us the core 17 consists of a flat plate, oblong in a general sense, but having its sides converging as they approach the ends of the plate, and the coils 18 are wound transversely on the plate and are confined between heads 19 through which the ends of the plate project. The heads 19 are held in place by pins 20, and the projecting ends of the core are provided with recesses 21. The electro-magnet 16 is mounted in a central horizontal position below the magnetic needle, on studs 23 which closely engage the recesses 21, and nuts 24 on each stud engage the upper and lower faces of the projecting ends of the core and hold the magnet securely in position; but by adjusting the nuts 24 the distance between the magnet and the magnetic needle may be varied so that when no current is passing through the magnet coils, the inductive effect of the core on the magnetic needle may be exactly adjusted to counteract or nearly overcome the earth's attraction for the needle and the needle will be responsive to a very slight current in the coils, thus making the apparatus extremely sensitive.

As will be understood, the magnet 16 is so positioned relatively to the needle 5 and scale 10, that when the needle is in its at rest position pointing to zero on the scale the needle will be transversely to the core and parallel with the helices of the coil.

When the electro-magnet is energized by closing a circuit from the battery, (connected as shown), through the coils, the magnetic needle will be attracted so as to carry the indicating or pointed end thereof over the scale, the extent of such movement varying directly, although not necessarily in exact proportion, with the current flow. The use of an electro-magnet renders the instrument extremely sensitive to slight current variations because the core augments the action of the coils and in order to equalize the effect of the core throughout the range of movement of the needle and to render such effect progressive and sufficiently proportional to give a readable distinction between the scale indications for slight current variations, especially as the positions indicating maximum current are approached.

We preferably form the core with converging sides so that, independently of the current in the coils, the core tends always to overcome the north-pointing tendency of the needle at whatever position, relatively to the scale, the needle may be in, thus opposing the attraction of the earth with approximate uniformity at all points of the scale and enabling us to employ a scale which will indicate circuit resistances from a short circuit to 100,000 ohms or more.

If the core were rectangular in shape its maximum effect, considered independently of the effect of the current in the coils, would be exerted when the needle pointed to its corner, owing to the increased mass of metal outside the path of the needle, and this effect would increase so rapidly, as the needle approached this position, as to prevent distinguishable readings for low resistances. In order to obtain a sufficient range of movement of the needle to indicate differences in the readings at low resistances, the sides of the core have a smaller curvature than the path of the needle-point so that the effect on the needle will increase gradually and uniformly.

While we prefer to construct the core of the shape herein illustrated, it is not our intention to limit the same to the form shown.

To prevent injury to the needle 5 or its mounting when the apparatus is not in use, a locking device is provided therefor which comprises a bent arm 25 arranged below the needle. One end of said arm encircles the needle support 6 while the other end projects through the side of the cup 4. A cam lever 26 is pivoted at 27 to the exterior of the cup 4, its upper end projecting above the cup through an opening in the flange surrounding same while the cam-shaped lower end engages with the projecting end of the lever 25. When the upper end of the lever 26 is moved to the left, the cam surface on the lower end will depress the outer end of the arm 25 lifting the needle from its support and holding it firmly against the cover 9 (Fig. 6) until released by a reverse movement of the pivoted lever 26.

Upon the casing 1 are secured the contact plates 31 and 32, each of which is provided with a binding post 33 and a binding nut 34, and also, if desired, with a series of holes 35.

One terminal of the magnet coils is secured to the contact plate 31; the other terminal of the coils being extended through the casing and connected to the battery contact 37. The chamber 2 which contains the battery 3 is provided with a door 38 which in the apparatus shown is made of metal and is arranged to swing on a pintle 39 by means of which it is carried in metallic contact with the contact plate 32. To the door 38 is secured a contact spring 40 which, when the battery is in place and the door closed, presses firmly against one electrode of the battery, holding the other electrode firmly against the contact 37.

The door 38 is locked in its closed position by means of a latch 42 pivoted at 43 to the casing and secured in its locked position by a screw 44 which engages a slot 45 in the latch 42.

The cup 4 is secured in the case 1 by means of screws 48 which pass through the bottom of the case and engage a yoke 49 secured to the bottom of the cup.

From the foregoing it will appear that the battery circuit is normally open between the contact plates, extending from the plate 32 to the door 38, contact spring 40 through the battery to the contact 37, through the magnet coils and to the plate 31. If therefore the contact plates be connected through an external circuit of negligible resistance, either by securing the terminals of the circuit to the binding posts or by inserting them in the holes 35 which are provided for that purpose, substantially the full battery current will flow through the magnet coils, and the needle 5 will swing into a position substantially perpendicular to that shown in Fig. 1, or until it points to the number 90 on the scale 10, which will indicate a short circuit across the binding posts. But if the resistance of the external circuit be considerable, the movement of the needle will be proportionally less, and the position of the needle will denote the amount of such resistance. The instrument can also be used in the place of an ordinary testing bell to determine the existence of leaks or grounds in electric circuits.

In using this instrument reference is ordinarily had to a table furnished to the user showing the ohmic resistance represented by the graduations of the scale, but if desired the resistance readings could be formed directly on the dial. In either case the resistance of an electric circuit or conductor can be determined between the limits of a short-circuit and 100,000 ohms with approximate accuracy from the direct reading of the scale.

The apparatus is extremely light and compact and may be readily carried in the pocket. This compactness of construction is rendered possible by the sensitiveness of the apparatus which permits the use of a single small battery cell. Furthermore the operation of the apparatus, and consequently the results obtained thereby, are uniform and are not likely to be affected by the rough usage which instruments of this class are apt to receive.

We claim:

1. In a galvanometer, the combination of a magnetic needle and an electro-magnet disposed below the same and means for adjusting the magnet vertically.

2. In a galvanometer, a magnet core of greater length than width and having its sides converging towards its ends.

3. In a galvanometer a flat magnet core the sides of which are bi-convex.

4. In a galvanometer a needle, a magnet core disposed in a horizontal central position relatively to the needle, and having a greater width at its center than at its ends.

5. In a galvanometer, the combination with a magnetic needle, an electro-magnet for actuating said needle comprising an elongated plate with converging sides, supports, and nuts adjustable on said supports and engaging the ends of the core.

6. In a galvanometer, the combination with a magnetic needle, an electro-magnet therefor comprising an elongated plate-like core, coils wound transversely around said plate, heads fitting over the ends of the plate for confining the coils, recesses in the ends of the plate outside the heads, supports engaging said recesses and adjusting nuts on said supports for engaging the ends of the plate.

7. In a galvanometer, the combination of a case of non-conducting material, a chamber therein, a battery cell in said chamber, means for closing said chamber, an electro-magnet having a soft iron core supported on the case outside said chamber, a magnetic needle centrally located relatively to the magnet, contacts carried by said case, means for securing the terminals of an external circuit thereto and connections forming a metallic circuit between said contacts to include the magnet helices and the battery.

8. In a galvanometer, the combination of a magnetic needle and an electro-magnet having a flat, soft iron core horizontally arranged below the needle.

9. In a galvanometer, the combination of a magnetic needle, an electro-magnet having a flat core horizontally arranged and means for varying the distance between the needle and the core.

10. In a galvanometer, the combination with a magnetic needle, of means, comprising a soft iron core having its mass reduced gradually towards its poles, for counteracting the earth's attraction for the needle when the instrument is out of circuit.

HARRY T. JOHNSON.
CHARLES E. AVERY.

Witnesses:
S. G. METCALF,
ALEXANDER SMITH.